United States Patent [19]

Filipovich et al.

[11] 4,205,894
[45] Jun. 3, 1980

[54] HERMETICALLY SEALED BINOCULARS

[75] Inventors: Danny Filipovich, Chicago, Ill.; Rudolf Hartmann, Winter Park, Fla.

[73] Assignee: Bell & Howell Company, Chicago, Ill.

[21] Appl. No.: 5,165

[22] Filed: Jan. 22, 1979

[51] Int. Cl.² ............................ G02B 7/06; G02B 7/12
[52] U.S. Cl. ......................................... 350/35; 350/67; 350/76
[58] Field of Search ....................... 350/35, 67, 61, 75, 350/76

[56] References Cited

U.S. PATENT DOCUMENTS

| | | | |
|---|---|---|---|
| 2,454,859 | 11/1948 | Case | 350/67 |
| 3,454,773 | 7/1969 | Bulthuis et al. | 350/35 |
| 3,787,688 | 1/1974 | Stone | 250/213 UT |

*Primary Examiner*—Jon W. Henry
*Attorney, Agent, or Firm*—Harold V. Stotland; Roger M. Fitz-Gerald

[57] ABSTRACT

The optical system in the binoculars includes a pair of sets of optical elements respectively on a pair of carriages mounted in an hermetically sealed housing. These carriages are moved by an external control toward and away from each other in order to vary the interpupillary distance between the two sets of optical elements. A transparent window or windows are located in front of the sets of optical elements and are hermetically mounted on the housing. The windows are large enough to be aligned with the sets of optical elements throughout the range of movement thereof.

18 Claims, 9 Drawing Figures

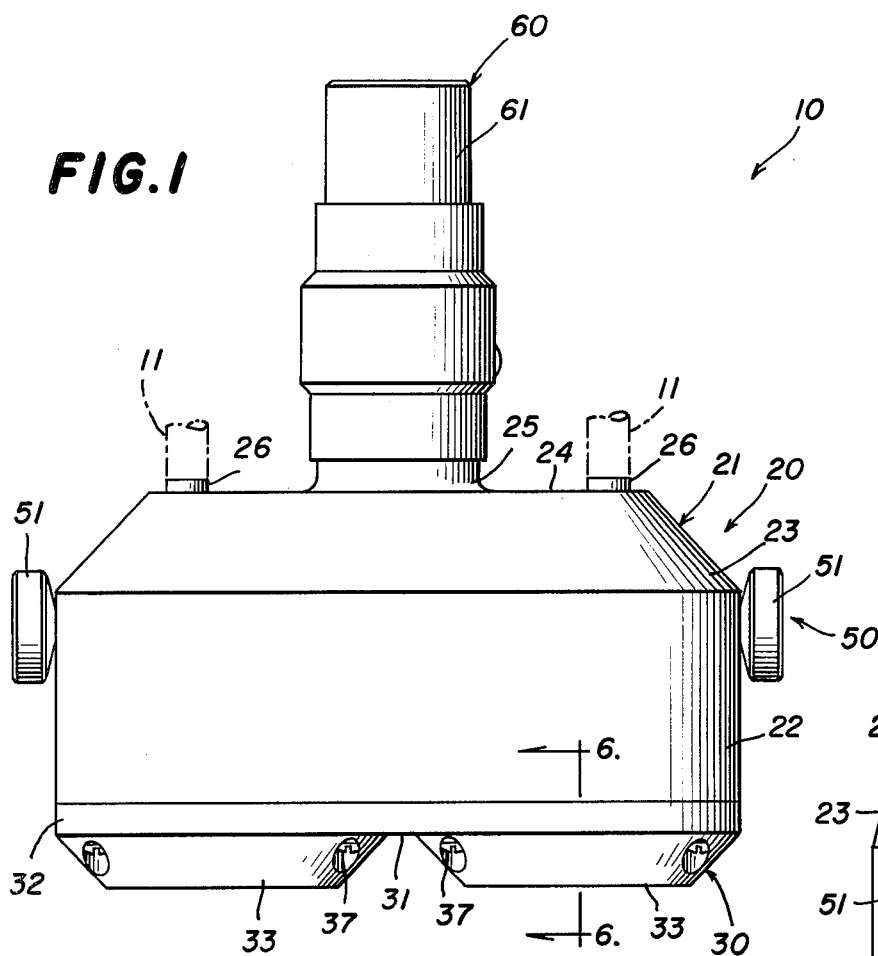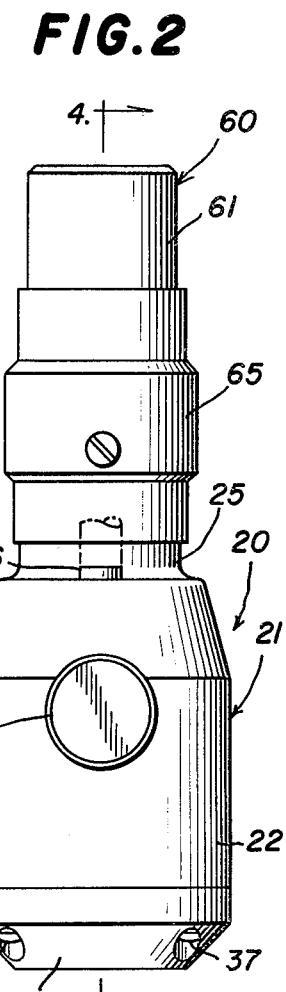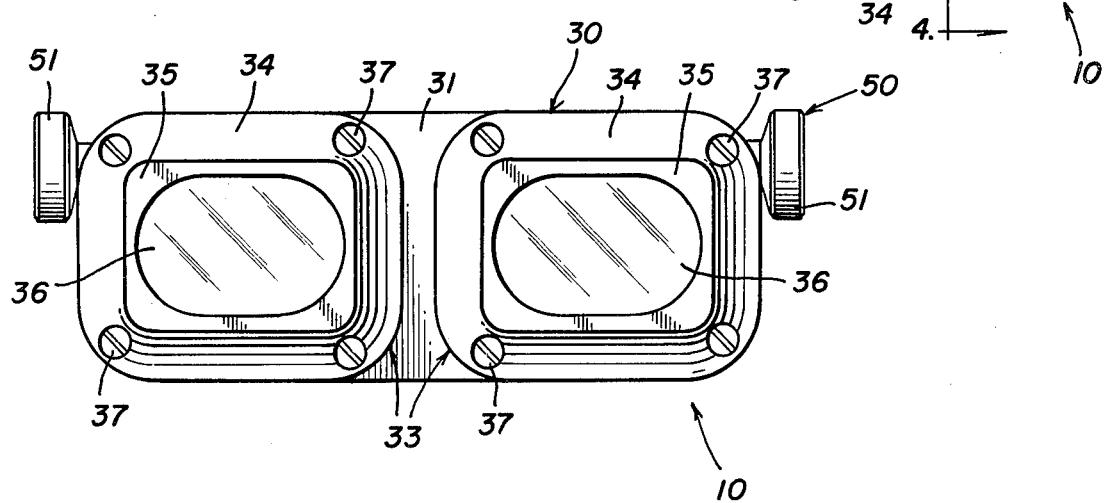

HERMETICALLY SEALED BINOCULARS

BACKGROUND OF THE INVENTION AND PRIOR ART STATEMENT

Binoculars may be strapped onto a user's head or may hang from his neck in order to permit hands-free operation. The binoculars may be mounted on a mask which can be readily put on and taken off the user's head. When such a mask is employed for use in starlight and moonlight, the mask serves the additional purpose of precluding stray light from striking the eyes. The interconnection between the binoculars and the mask usually is such as to enable the binoculars to be readily movable between use and storage positions.

In order that a user can "wear" such binoculars or goggles, as they are sometimes called, with a minimum of discomfort, they should be lightweight. Of course, they should cost as little as possible without sacrificing performance.

Furthermore, the optical elements and image intensification devices used in such binoculars are expensive and subject to damage in the presence of water or even moisture. Thus, a waterproof construction is desirable, yet not achieved by binoculars heretofore available.

Such binoculars must have the capability of being focusable on a particular object and also of being adjustable to match the distance between the user's eyes.

In the past, such focusability and adjustability were afforded at the expense of water repellency. For Example, a device made by Baird-Atomic, Inc. of Bedford, Massachusetts had means to make adjustments in the interpupillary distance, but it was not waterproof. Thus, water could undesirably leak into the binoculars and damage the interior elements.

Waterproof devices such as shown in U.S. Pat. No. 3,787,688 to Stone have separate viewing elements for each eye which are not focusable nor are the optical elements desirably contained in a single housing.

A common approach to varying the interpupillary distance is disclosed in U.S. Pat. No. 3,454,773 to Bulthuis et al. in which the optical elements are respectively mounted in two wings 5 and 6 which are pivotable about a common axis. Sealing such a construction against moisture is not easily accomplished. The eyepieces being located externally to the housing renders it extremely difficult to seal them against moisture.

SUMMARY OF THE INVENTION

It is therefore an important object of the present invention to provide low-cost and lightweight binoculars or goggles which can be strapped onto a user's head and can be focused and adjusted for interpupillary distance, yet is impervious to moisture.

Another object is to provide binoculars in which the eyepieces are located within the housing to facilitate moisture-proofing.

In summary, there are provided hermetically sealed binoculars comprising an hermetically sealed housing, a pair of carriages mounted in the housing for movement toward and away from each other, means for moving the carriages respectively within predetermined ranges and being accessible outside the housing, an optical system including a pair of sets of optical elements respectively mounted on the carriages, and transparent window means hermetically mounted on the housing in front of the sets of optical elements and being large enough to be aligned with the sets of optical elements throughout the predetermined ranges.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the invention.

BRIEF DESCRIPTION OF THE DRAWINGS

For the purposes of facilitating an understanding of the invention, there is illustrated in the accompanying drawings, a preferred embodiment thereof, from an inspection of which, when considered in connection with the following description, the invention, its construction, and operation and many of its advantages should be readily understood and appreciated.

FIG. 1 is a plan view of binoculars incorporating the features of the present invention;

FIG. 2 is a side-elevational view of the binoculars of FIG. 1;

FIG. 3 is a front-elevational view of the binoculars of FIG. 1;

DESCRIPTION OF THE PREFERRED EMBODIMENT

Figure 4:
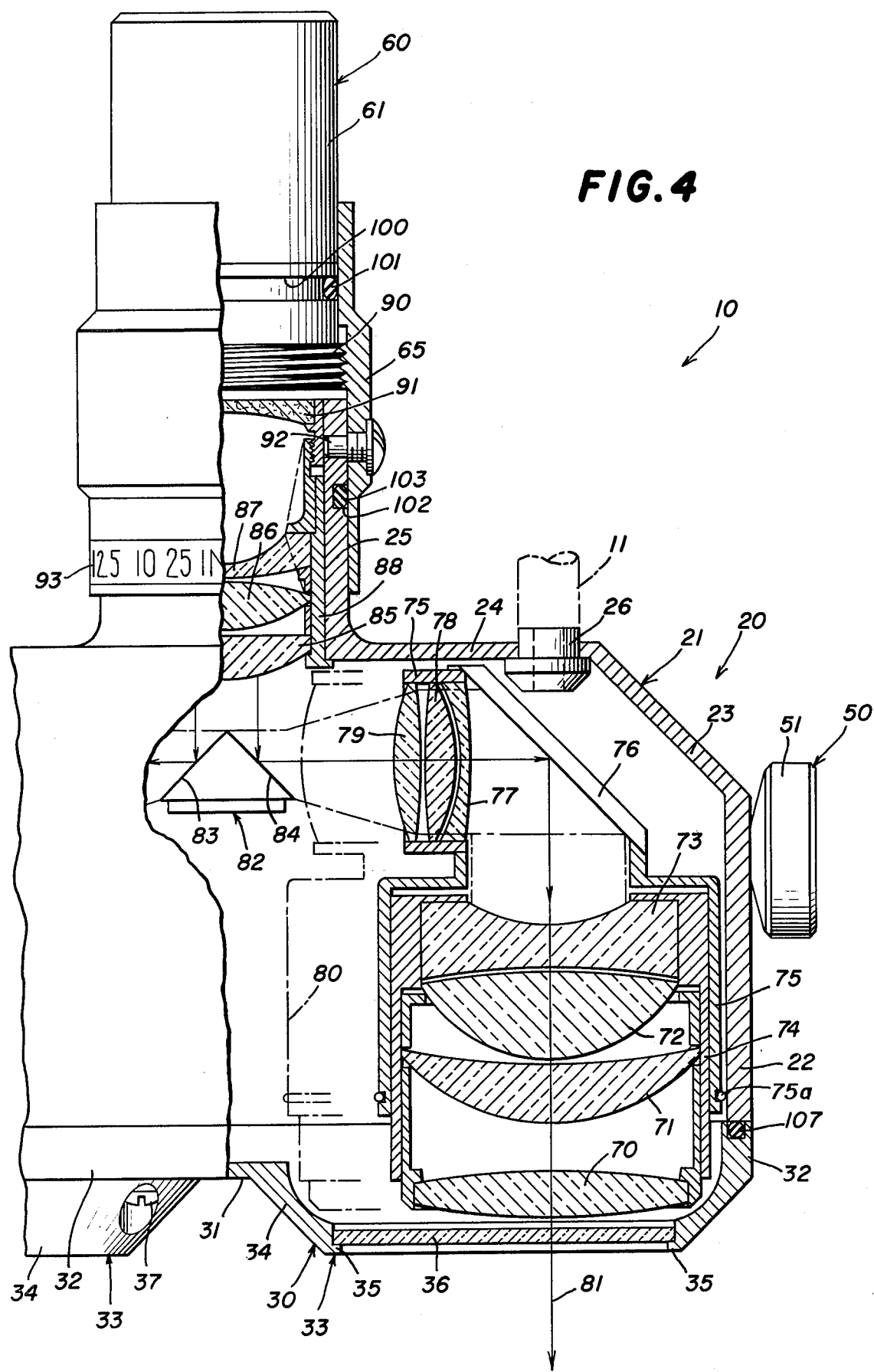
FIG. 4 is an enlarged view partially in horizontal section taken along the line 4—4 of FIG. 2 and the balance in plan.

Turning now to the drawings and more particularly to FIGS. 1-3 thereof, there is shown a pair of goggles or binoculars 10 which incorporate the features of the present invention. The binoculars 10 may be mounted on a mask (not shown) or other device which can be worn on the user's head. Shown in phantom in FIG. 1 are fastening elements 11 to be used in so attaching the binoculars 10.

The binoculars 10 comprise a housing 20, which includes a one-piece body 21 and a crown 30. The body 21 is made up of a main portion 22 which is generally rectangular in transverse cross section, a wall 23 that tapers rearwardly terminating in a wall 24 which in turn carries a neck 25. Protruding from the wall 24 is a pair of lugs 26 to which the fastening elements 11 are connected.

The crown 30 has a front surface 31, a depending skirt 32 and a pair of upstanding eyepiece portions 33. Each eyepiece portion is defined by a wall 34 which tapers forwardly and terminates in a rim 35 to which is hermetically sealed a window 36.

As will be explained shortly, there is located within the housing 20 an optical system defined by lens elements, mirrors, etc. The eyepiece portions of the optical system are respectively located immediately behind the windows 36. In order to enable adjustment of the spacing between these eyepiece portions to match the distance between the user's pupils, an interpupillary control mechanism 50 is provided. A pair of knobs 51 located on either side of the housing 20 is the only part of that mechanism which is visible in FIGS. 1-3. These knobs 51 are rotatable in one direction to move the eyepiece portions closer together and in the opposite direction to move them farther apart. The knobs 51 are ganged together, as will be explained, so that the interpupillary distance can be adjusted using either hand.

The binoculars 10 further comprise a focusing objective 60 having a barrel 61 and additional optical elements therein. A camming sleeve 65 encircles both the neck 25 and the barrel 61. Rotation of the camming sleeve 65 in one direction moves the barrel 61 in, while rotation in the opposite direction moves it out, thereby enabling focusing of the binoculars 10.

Turning now to FIG. 4, the interior of the housing 20 and additional details of the binoculars 10 will be described. The optical system portion of the binoculars 10 includes a set of four lens elements 70-73 mounted in a lens barrel 74. The lens elements 70-73 define the eyepiece portion of the optical system. The barrel 74 is in turn adjustably mounted within a carriage 75. The carriage 75 has an annular groove in its outer surface near the front thereof in which is located a wire 75a that is round in cross section. It may, for example, be made of polished, stainless steel wire. The optical system further includes a mirror 76 and lens elements 77, 78 and 79 mounted in another portion of the carriage 75. The lens elements 77-79 constitute an erector or inverter for inverting the image. The carriage 75 is moved by rotation of the knob 51, as will be described in more detail hereinafter, within the range defined by the solid line and the phantom line 80. The wire 75a provides a bearing surface to facilitate movement of the carriage 75 within the housing 20. Because of manufacturing tolerances, a slight space is necessary between the outer wall of the carriage 75 and the inner wall of the housing 20 as can be seen in FIG. 4. The wire 75a prevents undesirable vibration of the carriage 75, but at the same time, reduces friction that would normally occur between the plastic parts of the housing 20 and the carriage 75. The optical axis 81 of the lens elements 70-73, 77-79 is as far to the right as possible in the solid line condition of FIG. 4.

An identical set of lens elements 70-73 and 77-79, barrel 74, carriage 75 and mirror 76 is located on the left-hand side of the binoculars 10. It, too, has the same limits of movement and an optical axis corresponding to the optical axis 81.

Rotation of the knob 51 to move the carriage 75 to the phantom line 80 position will move the optical axis 81 toward the left. The position is selected to enable the optical axis 18 to be aligned with the user's right pupil. Rotation of the knob 51 simultaneously positions the identical set of optical elements on the left-hand side of the binoculars 10, until its optical axis is aligned with the left-hand pupil. The window 36 is large enough to render the entire usable area of the optical system, as represented by the lens element 70, visible to the user over the entire range of positions of the carriage 75. The same is true of the other half of the system not shown.

The optical system includes a mirror 82 having reflective surfaces 83 and 84 at right angles. Light is directed to the mirror 82 from a group of lens elements 85, 86 and 87 mounted in a barrel 88 attached in the neck 25 of the housing 20. The group of elements 85-87 constitutes a collimator.

A fourth part of the optical system is the objective 60, the barrel 61 of which mounts a plurality of lens elements (not shown) for use in focusing light from an object onto an image intensifier 90. The intensifier 90 is generally known, and detailed explanation is, therefore, not necessary. For the purposes of the present invention, it is sufficient to note that low level light is amplified or intensified by the image intensifier 90 to make it more readily visible by the user of the binoculars 10. The image produced by the intensifier 90 is applied to a fiber optical plate 91 which in turn transfers the image to the lens element 87.

The V mirror 82 is located at the stop of the optical system and splits the ray bundle from the collimator consisting of the elements 85-87 for right and left eye viewing. Because the mirror 82 is located at the stop of the optical system, each eye will see the complete field of view. The top bundles of rays are directed through the two halves of the optical system described above.

The camming sleeve 65 encircles the barrel 61 and the neck 25, having a pin 92 protruding therefrom and into a camming slot in the neck 25, all of which is known in this art. Thus, when the sleeve 65 is rotated in one direction, the barrel 61 moves outwardly, and vice versa, thereby to focus the binoculars 10. Indicia 93 represent the distance to the object.

As has been stated, an important object of this invention is to insure that the binoculars 10 are hermetically sealed to preclude moisture from entering the interior of the housing 20 to damage the image intensifier 90 or adversely affect the optical performance. To seal the joint between the barrel 61 and the camming sleeve 65, there is provided a groove 100 in the barrel 61 which receives an O-ring 101. To seal the joint between the camming sleeve 65 and the neck 25, the latter has a groove 102 in which is located an O-ring 103.

Figure 5:
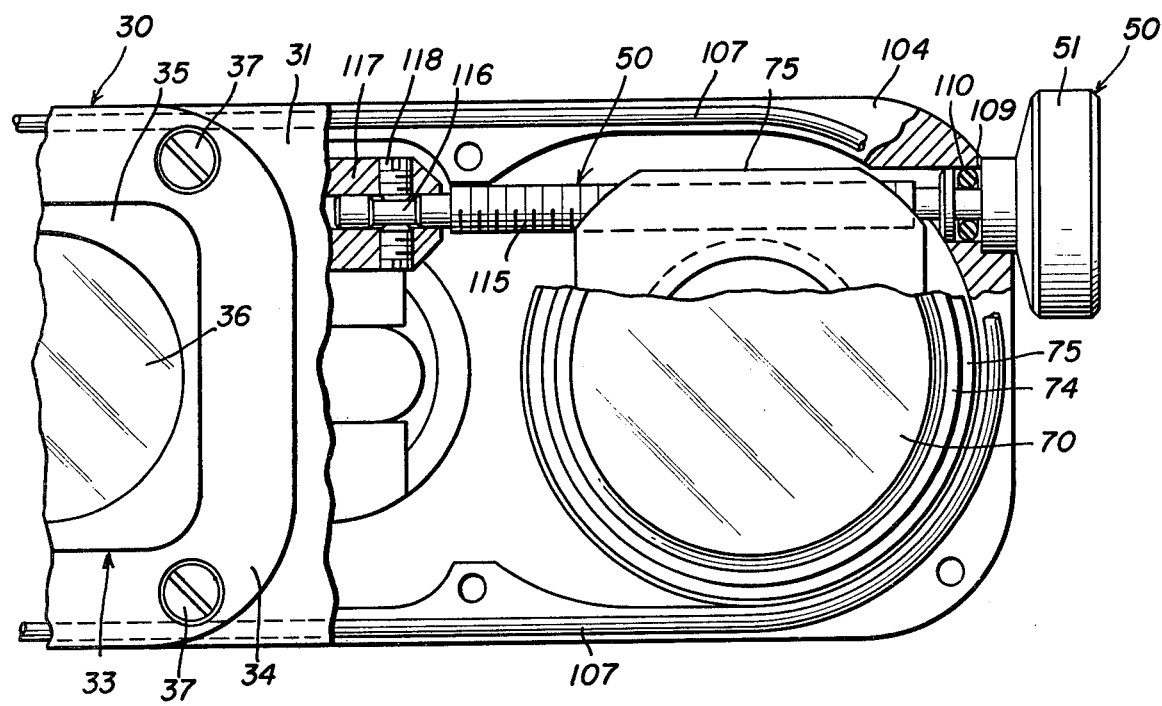
FIG. 5 is an elevational view of the front of FIG. 4, with the right-hand side of the crown and the top part of the lens elements both being cut away to expose various internal elements.
Figure 6:
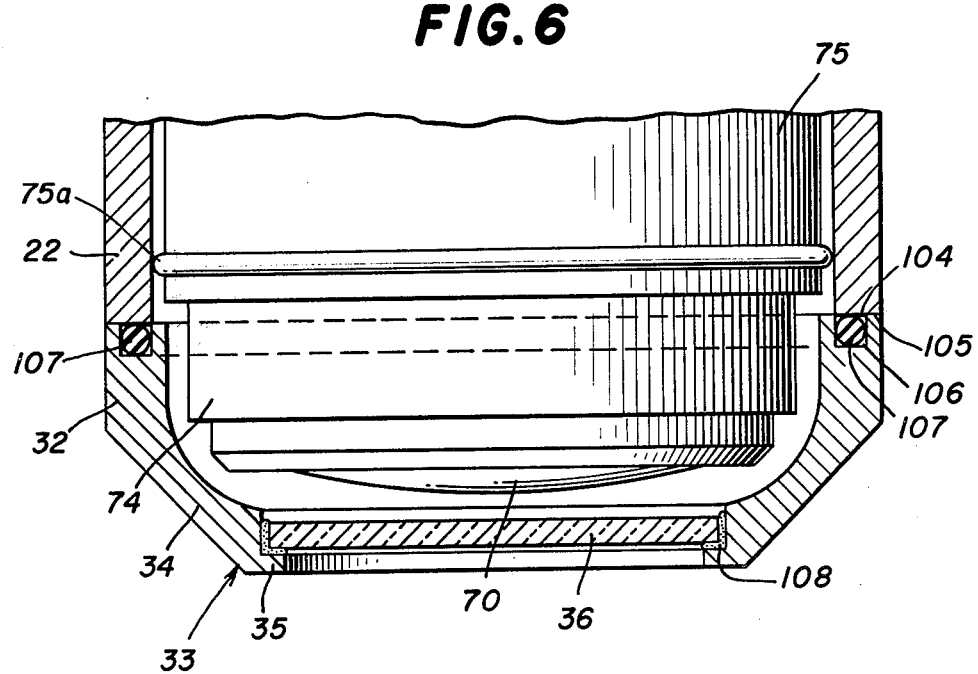
FIG. 6 is a sectional view on an enlarged scale taken along the line 6—6 of FIG. 1.

Additional details of the hermetic sealing of the binoculars 10 will be described by reference to FIGS. 5 and 6. The front surface 104 of the main portion 22 of the housing 20 mates with the rear surface 105 of the crown 30. An oval groove 106 in the surface 105 extends around the entire periphery of the crown 30 and contains an O-ring 107. When the screws 37 are tightened, the O-ring 107 is deformed to provide an hermetic seal between the crown 30 and the body 21. Hermetic sealing of each of the windows 36 is provided by means of cement 108 joining the window 36 to the rim 35.

Another seal is provided between each of the knobs 51 and the main portion 22 of the body 21. An annular groove 109 contains an O-ring 110 which provides a seal against moisture even though the knob 51 is rotatable.

Attention now will be directed to the interpupillary control mechanism 50. It includes a threaded rod 115 fixed to the knob 51 and threadably engaging in a threaded bore in the carriage 75. Thus, rotation of the knob 51 in one direction causes the carriage to move, for example, inwardly and carry the lens elements 70-73 and 77-79 (FIG. 4) inwardly. Rotation in the opposite direction moves these elements outwardly. The inner end 116 of the rod 115 is unthreaded, is of reduced diameter and fits within a coupler 117 having a pair of set screws 118. Although not shown, an identical threaded rod is provided on the other side and its unthreaded end also fits within the coupler 117 adjacent to a second pair of such set screws. At the factory, these set screws are loosened and the knobs 51 are rotated so that the desired starting position of each is obtained and each is in the same relative position. Then the set screws are tightened. The two knobs 51 and the threaded rods are threaded into the two carriages in left and right-hand senses respectively, in order that rotation of either knob 51 simultaneously move both the carriages 75 outwardly or inwardly depending upon the direction of knob rotation.

Figure 7:
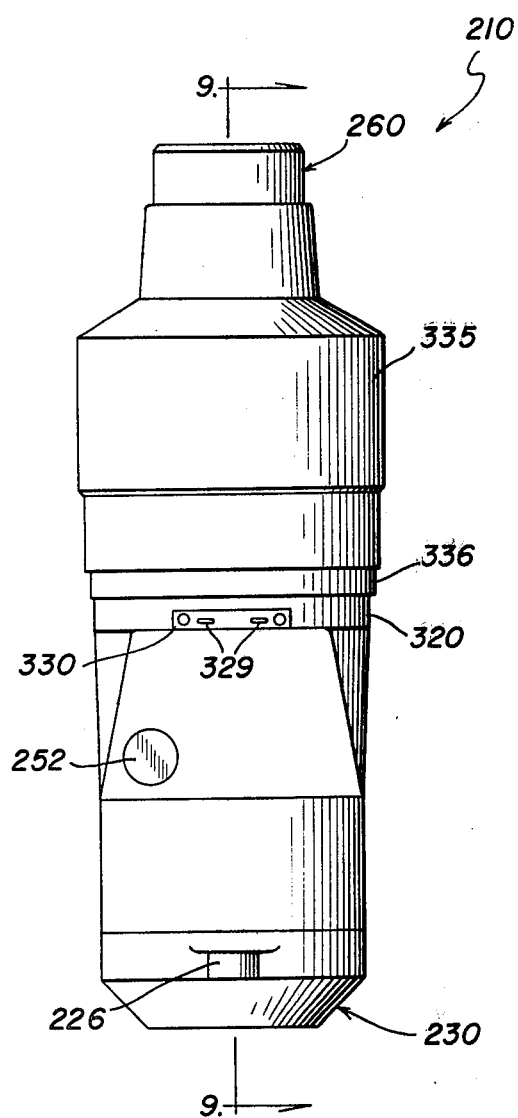
FIG. 7 is a side-elevational view of the binoculars incorporating the features of a second embodiment of the present invention.
Figure 8:
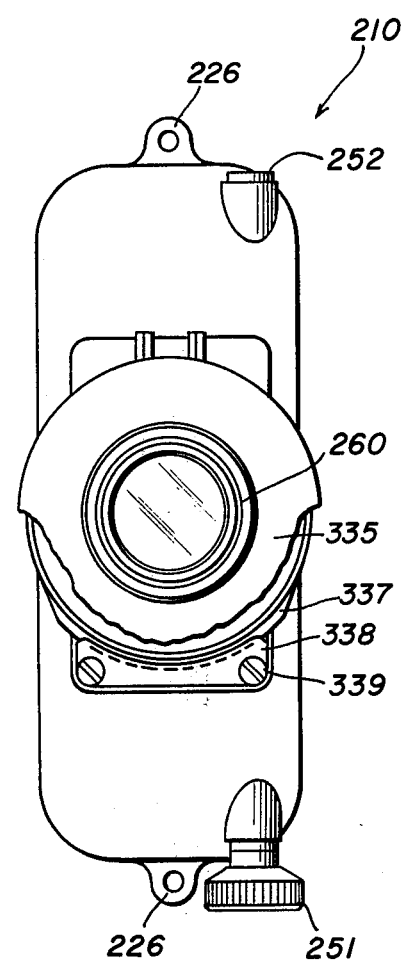
FIG. 8 is a rear-elevational view of the binoculars of FIG. 7.
Figure 9:
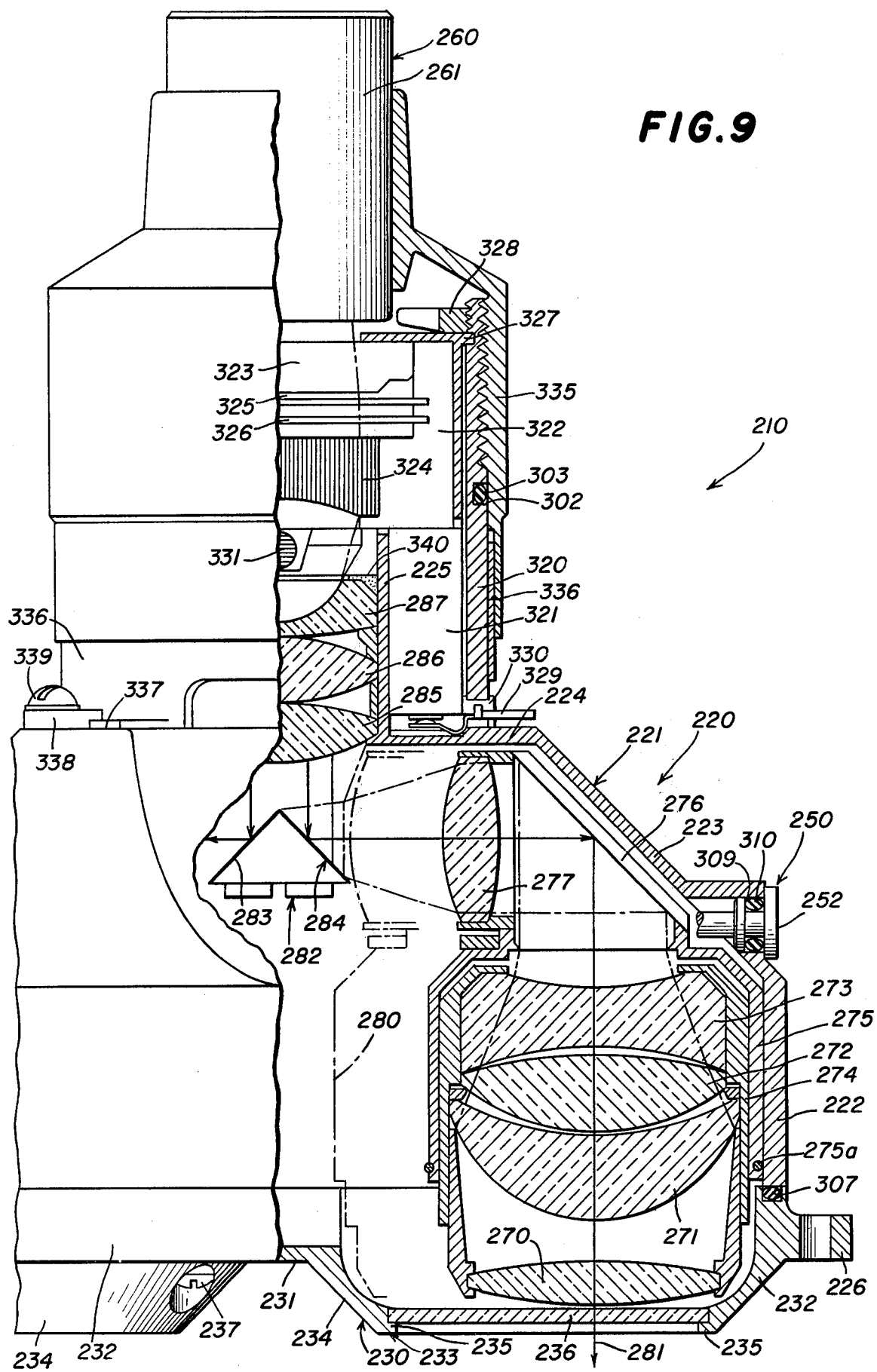
FIG. 9 is an enlarged view partially in horizontal section taken along the line 9—9 of FIG. 7 and the balance in plane.

Turning now to FIGS. 7-9, a second embodiment of the present invention will be described. In order to simplify the description of this second embodiment and to facilitate comparison between the two, corresponding parts are labelled with corresponding reference numerals having 200 added thereto.

Depicted in FIGS. 7-9 are binoculars 210 which are adapted to be hung from a user's neck rather than mounted on a mask as was the case with the first embodiment. For this purpose, a pair of lugs 226 is provided integral with the crown 230. The rest of the elements 220-237 are basically the same as the corresponding elements in the first embodiment, although the details are somewhat different. Only the O-ring 307 is shown with respect to hermetically mounting the crown 230 to the housing 220, but it is understood that the details are generally the same as described previously with respect to the first embodiment.

The interpupillary control mechanism 250 has but a single knob 251, a bushing 252 being used in place of the other knob. Although not shown, the mechanism 250 incorporates elements similar to the elements 115-118 in the first embodiment.

The binoculars 210 further comprise a focusing objective 260 having a barrel 261 and additional optical elements therein. The structure for moving the barrel 261 in and out is different in the second embodiment, as will be described.

The optical system in the binoculars 210 is basically the same, although some of the details are different. In the second embodiment, the optical system includes four lens elements 270-273 having different parameters than the corresponding elements in the first form. The erector or inverter has only a single lens elements 277. The carriage 275 is somewhat different in terms of details but generally corresponds to the carriage 75 in the first embodiment. The balance of the optical system in the second embodiment is basically the same.

In this form, the housing 220 includes a second, exterior neck 320 concentric with the neck 225 but of greater diameter and about twice the length. In the donut-shaped space between the two necks is located a donut-shaped power supply 321 which furnishes power to an image intensifier 322. The image intensifier 322 includes as a part thereof a front window 323, a fiber optics element 324, an anode 325, and a cathode 326. The image intensifier 322 occupies most of the space between the front end of the neck 225 and the front end of the neck 320. A cup-like, anti-radio frequency shield 327 has a side wall interposed between the image intensifier 322 and the neck 320, and has an end wall abutting against the front of such image intensifier. A retaining ring 328 is threaded to internal threads on the front end of the neck 320, thereby pressing the shield 327 toward the housing surface 224 and thus holding the image intensifier 322 and associated power supply 321 firmly in place. The power supply 321 and the image intensifier 322 are electrically interconnected by means not shown.

There is provided a pair of contacts 329 having interior ends arranged to engage the terminals of the power supply 321 and external ends protruding through the neck 320, which external ends are adapted to be mated with a source of power such as a battery pack (not shown). The contacts 329 extend through a plastic block 330 which is heat staked to the neck 320.

Also associated with the image intensifier 322 is a set of three photo cells 331 arranged adjacent to the fiber optics element 324 at equi-angularly points therearound. These photo cells sense light on the fiber optics element 324 to enable automatic adjustment of the brightness.

The binoculars 210 further comprise a focusing sleeve 335 which is internally threaded so as to engage external threads on the neck 320. The front end of the sleeve 335 is inset and is cemented to the barrel 261 of the objective 260. Rotation of the sleeve 335 in one direction will move the objective 260 outwardly while rotation in the opposite direction will move it inwardly to enable focusing of the binoculars 210. Rotation of the sleeve 335 is limited by means of a stop ring 336 which carries a narrow, outwardly directed flange 337. A generally C-shaped clip 338 is mounted to the surface 224 of the housing 220 by means of screws 339. When these screws 339 are tightened, the stop ring 336 is urged in tight contact with the surface 224. The ring 336 has two abutments which respectively engage with abutments on the sleeve 335 to enable focusing over the desired range.

In order to gain access to the image intensifier 322 and the power supply 321 to service or replace them, the screws 339 and the C clip 338 are removed. Then the sleeve 335 can be rotated until it has been detached. Then, the retaining ring 328 can be unthreaded and the shield 327 removed. The image intensifier 322 and/or the power supply 321 can then be removed and repaired or replaced. The binoculars must be recalibrated by adjusting the position of the stop ring 336.

The joint between the frontmost lens element 287 is hermetically sealed by means of a sealant 340 thereby rendering the entire optical system mositureproof. In other words, moisture which could adversely affect performance of the lens elements, cannot enter the space in which they are located. During manufacture, the screws 237 are loosened and nitrogen or the like is applied by suitable valve means (not shown) to the interior of the housing 220 to drive moisture through the screw holes.

The rest of the binoculars 210 is only waterproof. The cement between the sleeve 335 and the objective 260, and the O-ring 303 between the sleeve 335 and the neck 320 prevent water from entering the area occupied by the image intensifier 322 and the power supply 321. These elements will not be adversely affected by just moisture since they are preferably noncorrosive. The plastic block 330 being heat staked to the neck 320 prevents water from entering the housing 220 via the opening for the contacts 329.

What has been described, therefore, are two embodiments of an improved pair of binoculars in which all of the optical elements are located in the housing, the optical elements being movable to accommodate interpupillary adjustment. The entirety of the housing is hermetically sealed, yet the binoculars are lightweight and relatively inexpensive.

We claim:

1. Hermetically sealed binoculars comprising an hermetically sealed housing, a pair of carriages mounted in said housing for movement toward and away from each other, means for moving said carriages respectively within predetermined ranges and being accessible outside said housing, an optical system including a pair of sets of optical elements respectively mounted on said carriages, and transparent window means hermetically mounted on said housing in front of said sets of optical elements and being large enough to be aligned with said sets of optical elements throughout said predetermined ranges.

2. The hermetically sealed binoculars of claim 1, and further comprising sealing means between said moving means and said housing to render the junction therebetween substantially watertight.

3. The hermetically sealed binoculars of claim 1, comprising a single means for simultaneously moving said carriages.

4. The hermetically sealed binoculars of claim 1, wherein said moving means includes a threaded rod threadably engaging said carriages.

5. The hermetically sealed binoculars of claim 1, wherein said moving means includes a shaft and at least one knob for rotation thereof, and further comprising an O-ring between said shaft and said housing to render the junction therebetween substantially watertight.

6. The hermetically sealed binoculars of claim 1, wherein said moving means includes two threaded rods respectively engaging in mating threaded bores in said carriages, and a coupler for interconnecting said threaded rods, said coupler being initially loosened to enable individual positioning of said rod and thereafter tightened to enable simultaneous movement of said carriages.

7. The hermetically sealed binoculars of claim 6, wherein each rod carries a knob exteriorly of said housing to enable movement of said carriages by either hand.

8. The hermetically sealed binoculars of claim 1, wherein said window means includes a pair of platelike windows respectively mounted in front of said pair of sets of optical elements.

9. Hermetically sealed binoculars comprising an hermetically sealed housing including a one-piece body and a crown therefor, first sealing means between said body and said crown, fastening means for attaching said crown to said body, a pair of carriages mounted in said body for movement toward and away from each other, means for moving said carriages respectively within predetermined ranges and being accessible outside said housing, second sealing means between said moving means and said body to render the junction therebetween substantially watertight, an optical system including a pair of sets of optical elements respectively mounted on said carriages, and transparent window means hermetically mounted on said crown in front of said sets of optical elements and being large enough to be aligned with said sets of optical elements throughout said predetermined ranges.

10. The hermetically sealed binoculars of claim 9, wherein said fastening means are screws.

11. The hermetically sealed binoculars of claim 9, wherein said crown and said housing have mating surfaces, one of said surface having a groove therein, said first sealing means being an O-ring in said groove.

12. The hermetically sealed binoculars of claim 9, wherein said body has a first portion which is generally rectangular in transverse cross section and a second portion which tapers rearwardly.

13. The hermetically sealed binoculars of claim 9, wherein said window means includes a pair of platelike windows respectively mounted in front of said pair of sets of optical elements.

14. The hermetically sealed binoculars of claim 9, wherein said crown includes a pair of annular walls tapering forwardly, said window means including a pair of windows respectively carried by said walls, said windows being large enough to be aligned respectively with said sets of optical elements throughout said predetermined ranges.

15. The hermetically sealed binoculars of claim 14, wherein each of said walls terminates in a rim to which the associated window is cemented.

16. Hermetically sealed binoculars comprising an hermetically sealed housing, a pair of carriages mounted in said housing for movement toward and away from each other, means for moving said carriages respectively within predetermined ranges and being accessible outside said housing, first sealing means between said moving means and said housing to render the junction therebetween substantially watertight, an optical system including first and second and third and fourth sets of optical elements, said first and second sets being respectively mounted on said carriages, transparent window means hermetically mounted on said housing in front of said sets of optical elements and being large enough to be aligned with said sets of optical elements throughout said predetermined ranges, said third set of optical elements being fixedly mounted in said housing and being arranged to pass light into both of said first and second sets of optical elements, a barrel carrying said fourth set of optical elements and being located along the same optical axis as said third set of optical elements, a sleeve encircling said housing and said barrel and being rotatable to move said barrel axially, second sealing means between said housing and said sleeve to render the junction therebetween substantially watertight, and third sealing means between said sleeve and said barrel to render the junction therebetween substantially watertight.

17. The hermetically sealed binoculars of claim 16, wherein said housing has a rearwardly extending neck in which said third set of optical elements is located, and said sleeve encircles said neck and said barrel.

18. The hermetically sealed binoculars of claim 16, wherein said housing and said barrel respectively have annular grooves therein, said second sealing means being an O-ring located in said first groove, and said third sealing means being an O-ring located in said second groove.

* * * * *

UNITED STATES PATENT AND TRADEMARK OFFICE
CERTIFICATE OF CORRECTION

PATENT NO. : 4,205,894
DATED : June 3, 1980
INVENTOR(S) : Danny Filipovich, Rudolf Hartmann It is certified that error appears in the above-identified patent and that said Letters Patent are hereby corrected as shown below:

Column 1, line 31, change "Example" to --example--;

Column 2, line 41, change "plane" to --plan--;

Column 4, line 21, delete "top" and insert --two--; and

Column 5, line 45, change "elements" to --element--.

Signed and Sealed this

Third Day of November 1981

[SEAL]

*Attest:*

*Attesting Officer*

GERALD J. MOSSINGHOFF

*Commissioner of Patents and Trademarks*